June 13, 1972   CHARLES CHUNG SEN IH ET AL   3,669,673
RECORDING OF A CONTINUOUS TONE FOCUSED
IMAGE ON A DIFFRACTION GRATING
Filed Oct. 23, 1970
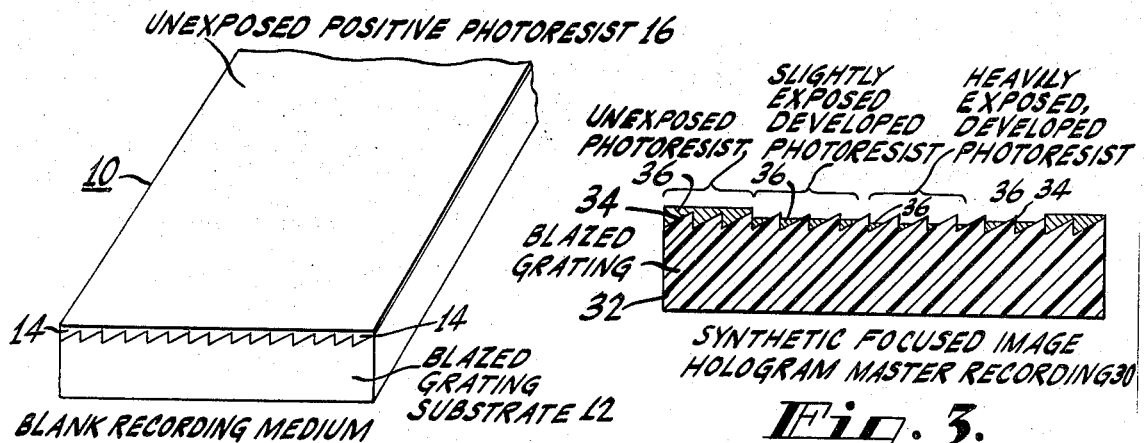
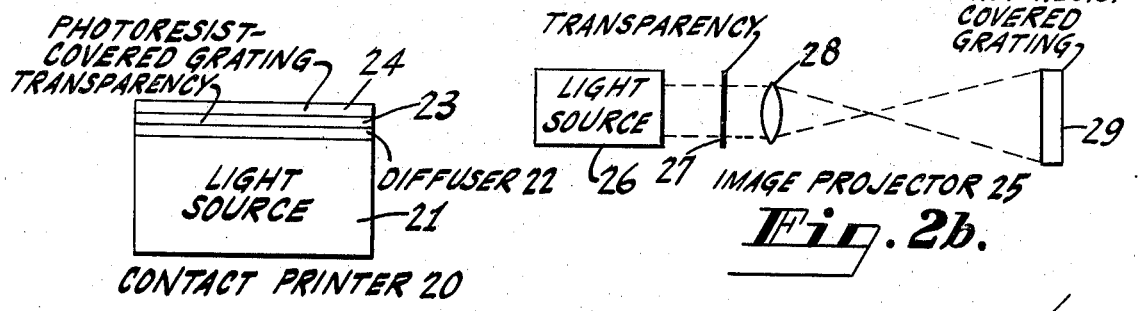
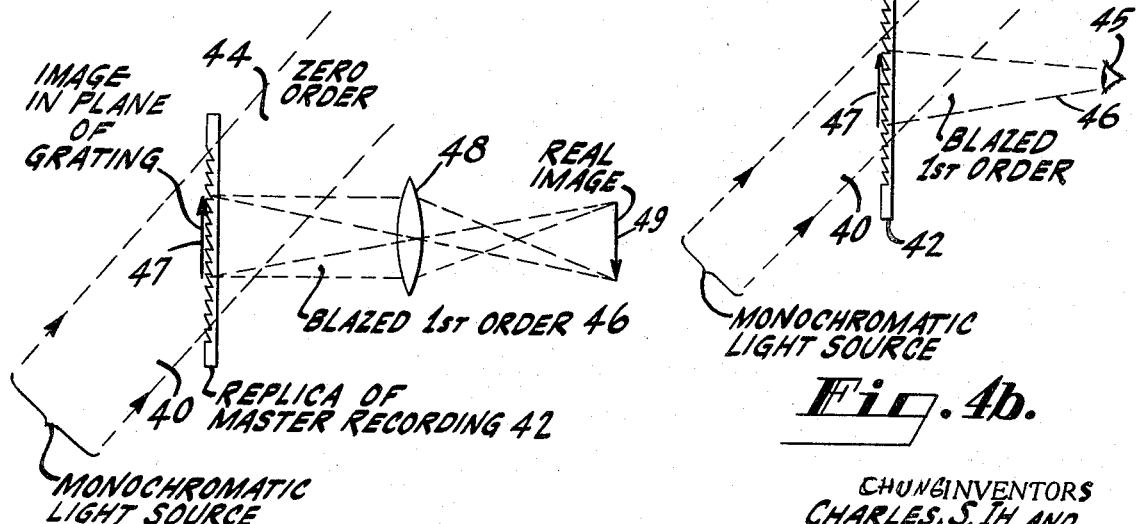
INVENTORS
CHARLES CHUNG S. IH AND
MICHAEL J. LURIE
BY George J. Seligsohn
Attorney United States Patent Office 3,669,673
Patented June 13, 1972

3,669,673
RECORDING OF A CONTINUOUS TONE FOCUSED IMAGE ON A DIFFRACTION GRATING
Charles Chung Sen Ih, Trenton, and Michael Jay Lurie, East Brunswick, N.J., assignors to RCA Corporation
Filed Oct. 23, 1970, Ser. No. 83,424
Int. Cl. G03c 5/00
U.S. Cl. 96—38.3
4 Claims

ABSTRACT OF THE DISCLOSURE

A recording medium blank is employed comprising a substrate having a diffraction grating, composed of a plurality of spaced line ridges, on a surface thereof, together with a photoresist disposed on this surface which fills the spaces between adjacent line ridges. This provides a substantially smooth exterior surface of the photoresist which is situated in proximity with the respective tops of the line ridges making up the diffraction grating. By exposing such a recording blank to a focused image of any complex object and then developing the photoresist, a diffraction grating with modulated efficiency is formed, constituting a synthetic focused image hologram; which displays the original focused image when properly viewed. A stamping master, which can be prepared from this modulated grating record, is useful in embossing replications on thermoplastic material, such as vinyl for instance.

---

This invention relates to the recording of a type of focused image hologram and, more particularly, to a particular technique for recording of synthetic focused image holograms.

As is known, by exposing an area of the surface of a photosensitive recording medium with a first beam of coherent light which forms a focused image of an object in coincidence with this area on the surface of the medium and simultaneously exposing the same area with an unmodulated second beam of the coherent light which is angularly displaced with respect to the first beam, an interference pattern called a focused image hologram is recorded.

The focused image hologram comprises a spatial carrier-frequency, having a spatial wavelength determined by the wavelength of the coherent light employed in recording the hologram and the geometry of the interfering first and second incident beams of coherent light with respect to the recording surface, which spatial carrier-frequency is spatially-modulated solely in amplitude in accordance with the object information contained, over the area of the focused image, by the first beam of coherent light. It will be seen that in the recording of a conventional focused image hologram the spatial carrier-frequency and the focused image must be recorded simultaneously and both must be coherent with respect to each other because the production of the spatial carrier-frequency depends upon the interference at the recording medium between a focused-image first beam of coherent light and an angularly displaced reference second beam of coherent light. If either one of these two beams is not simultaneously present with the other, or the two beams are not mutually coherent, no spatial carrier-frequency will be recorded.

The present invention is directed to a technique for recording synthetic focused image holograms in which the generation of the spatial carrier-frequency is independent of an object having a focused image which is to be recorded. This makes it possible to achieve higher fidelity in the recording of complex object information, such as that obtained from thhe transparency of a pictorial scene, for instance, this is achievable with a conventional focused image hologram. The reason for this is that such distortion as the generation of speckle noise and other wanted noise signals does not take place in the recording of a synthetic focused image hologram in accordance with the principles of the present invention (as they do in the recording of a conventional focused image hologram) because object information is not recorded by a beam of light which is coherent with the generation of the spatial carrier-frequency (as is the case in the recording of a conventional focused image hologram).

It is therefore an object of the present invention to provide an improved technique for recording focused image holograms.

Briefly, in accordance with this technique, a recording blank for recording a focused image hologram is employed in which the blank comprises a substrate having a given surface thereof formed of a plurality of spaced line ridges disposed to provide a predetermined diffraction grating on the substrate. A given photoresist disposed on the given surface of the substrate within and filling the spaces between adjacent line ridges provides a substantially smooth exterior surface of the given photoresist which is situated in proximity with respective tops of the line ridges. The substrate is composed of a given material which is unaffected by the exposure through recording radiation or the development of the given photoresist.

The present invention will become more apparent from the following detailed description taken together with the accompanying drawing, in which:

FIG. 1 illustrates a preferred embodiment of a blank recording medium;

FIG. 2a illustrates in diagrammatic form a contact printer for exposing the blank recording medium of FIG. 1 to the pattern on a transparency;

FIG. 2b is an image projector for exposing a blank recording medium to a focused image of the visual pattern on a transparency;

FIG. 3 illustrates diagrammatically in cross section a synthetic image hologram master recording on a developed, exposed recording medium;

FIG. 4a schematically illustrates the projection of a real image from a replica of the synthetic focused image hologram master recording of FIG. 3, and FIG. 4b schematically illustrates the viewing of the image on the surface of a replica of a synthetic focused image hologram master recording of FIG. 3.

Referring now to FIG. 1, there is shown blank recording medium 10. Medium 10, includes blazed grating substrate 12, which has a blazed grating on the upper surface thereof. As shown, the grating comprises the plurality of parallel, spaced, saw-tooth line ridges 14. Although the number of line ridges may be as little as a few hundred per millimeter, preferably, the number of line ridges is 1,000 or more per millimeter. The reason for this is that the resolution capability of the recording medium increases as a direct function of the number of lines per millimeter.

A given unexposed positive photoresist 16 is disposed as shown on the top surface of substrate 12 within and filling the spaces between adjacent line ridges 14 to provide a substantially smooth exterior surface of photoresist 16 which is situated in proximity with the respective tops of the line ridges.

Grating substrate 12 may be made of any material which is unaffected by the exposure to recording radiation or the development of photoresist 16. However, preferably, substrate 12 is composed of a thermoplastic tape, such as an acetate or vinyl tape, having the plurality of line ridges 14 forming the blazed grating embossed on the top surface thereof.

Referring now to FIG. 2a, there is shown a first manner of exposing the exterior surface of photoresist 16 of blank recording medium 10 to a pattern on a transparency. In particular, a contact printer 20 is shown consisting of light source 21 having a top plate 22, which may consist of a piece of opal or ground glass. Light source 21 is selectively operated for a predetermined exposure time interval. In contact with the top of plate 22 is transparency 23. Transparency 23 is a positive transparency, i.e., light-manifesting portions are relatively transparent and dark-manifesting portions are relatively opaque. In contact with the upper surface of transparency 23 is positive photoresist-covered grating 24, which is identical to blank recording medium 10, shown in FIG. 1. Photoresist-covered grating 24 is oriented with the exterior surface of the photoresist in contact with the top surface of transparency 23, so that in response to light source 21 being operated, the intensity of light reaching any point on the area of the exterior surface of the photoresist of photoresist-cover grating 24 is determined by the relative opacity of transparency 23 at that point. In this manner, the exterior surface of the photoresist-covering grating 24 is differentially exposed over this area in accordance with the pattern on transparency 23.

Light source 21 in FIG. 2a need not be coherent. In fact light source 21 is preferably an extended light source, such as a white light source for instance.

A second manner of exposing blank recording medium 10 is by means of image projector 25, shown in FIG. 2b. In particular, light source 26, which preferably also is a non-coherent, extended light source, is effective when operated in illuminating positive transparency 27 with a beam of incident light. In response thereto, transparency 27 spatially modulates the intensity of the light transmitted therethrough in accordance with a pattern thereon. Convex lens 28 is effective in imaging the pattern on transparency 27 on the photoresist surface of photoresist-covered grating 29, which is identical to blank recording medium 10.

After exposure, whether by contact printer 20 or image projector 25, the photoresist-covered grating is developed in a conventional manner by placing it in an etching solution for a given time. The etching solution dissolves each point of the positive photoresist at a rate which is a direct function of the amount of light radiation to which that point has been exposed. What results is a synthetic focused image, formed by the modulated diffraction of FIG. 3. FIG. 3 is, of course, merely exemplary.

Referring now to FIG. 3, there is schematically shown in cross section a modulated diffraction grating (synthetic focused image) master recording which has been made by exposing and developing a blank recording medium of the type shown in FIG. 1.

The recording 30, shown in FIG. 3, consists of blazed grating substrate 32, corresponding to blazed grating substrate 12 of blank recording medium 10, on which is situated a plurality of line ridges 34, corresponding to line ridges 14 of FIG. 1, and developed photoresist 36, corresponding to unexposed positive photoresist 16 of FIG. 1. For the sake of clarity, in both FIGS. 1 and 3, the size of each line ridge is greatly exaggerated and the number of line ridges per millimeter is greatly reduced from what occurs in practice. As brought out above, the number of line ridges in practice is preferably in the order of 1,000 per millimeter. The height of each line ridge (the vertical difference between the top and bottom thereof) is preferably no more than one or two microns in practice, but may be less.

As illustrated in FIG. 3, the developed photoresist includes unexposed portions, slightly exposed portions and heavily exposed portions. The unexposed portions correspond to those portions of the unexposed photoresist in FIG. 1 which were not illuminated at all during the exposure thereof. The slightly exposed portion of the developed photoresist 36 correspond with relatively dark portions of the pattern on the transparency so that these slightly exposed portions of developed photoresist 36 were illuminated relatively slightly during exposure thereof. The heavily exposed portions of photoresist 36 correspond with the relatively light or transparent portions of the pattern on the transparency so that these heavily exposed portions of the developed photoresist 36 were illuminated to a relatively large degree during exposure of the photoresist.

It will be seen that the top surface of master recording 30 has recorded thereon a relief pattern of the focused image of the transparency. In this relief pattern, more or less of the overall height of any line ridge is revealed at any point of the relief pattern, depending upon the respective thickness of the photoresist at points contiguous therewith. In particular, when positive protoresist is used, those points which are associated with more heavily exposed portions of the developed photoresist 36 will have a greater portion of the overall height of the line ridges 34 contiguous therewith revealed than points associated with relatively less heavily exposed developed photoresist. The unexposed portions of photoresist 36 will have the minimum portion of the height of line ridges 34 associated therewith revealed. This minimum, as shown in FIG. 3, is preferably zero.

The master recording, of the type shown in FIG. 3, may be employed in making replicas thereof, which can be either reflective or transparent. In particular, by electroless plating, followed by electroplating, a stamping mold of the synthetic focused image hologram master recording is obtained. This stamping mold can be utilized to emboss replica synthetic focused image holograms (modulated diffraction gratings) in thermoplastic material by pressing heated, somewhat softened, thermoplastic material. This thermoplastic material may be a clear vinyl tape, by way of example, in which case a transparent replica of the master recording is obtained. (In the alternative, the replica of the master recording may be renedered reflective, as is known in the art.)

For illustrative purposes, FIGS. 4a and 4b show the manner of reading out a transparent replica of the master recording by either projection of a real image onto a screen, or by direct viewing. Referring now to FIG. 4a, light from a source (not shown), which may be a laser, but is preferably a non-coherent light source, applies incident beam of light 40 to a transparent replica of master recording 42. The light source may be monochromatic, or may have any bandwidth. If the color of the source (e.g. white) is to be faithfully reproduced by the viewing optics, then all the light from every point on the grating or its replicas must be collected by the viewing optics. With a broad spectrum source and a high dispersion grating, a large aperture viewing system is required if preserving the color of the source is desired. The modulated diffraction grating (or synthetic focused image hologram) on the left surface of recording 42 is effective in diffracting the incident light of beam 40 into zero order component 44 and a plurality of pairs of higher order components, none of which is shown except blazed first order 46, which is employed to obtain a real image of the focused image in the plane of the grating of master recording 42.

As is known in the art, the use of a blazed grating increases the optical efficiency of the readout system by concentrating a greater percentage of the total incident light in the useful blazed first order, at the expense of the percentage of the incident light in the non-blazed first order and the higher orders, than would be the case if a symmetrical, non-blazed grating were employed. It is for this reason that a blazed grating is preferred. However, the present invention contemplates the use of non-blazed, other types of gratings, although the optical efficiency of such other types of gratings is lower than that of a blazed grating.

As is known in the art, the angular divergence between the zero order and the first order is a function of the wavelength of the incident light, the number of lines per millimeter of the grating and the geometric orientation of the incident light with respect to the grating. Since all these parameters are substantially constants in the case of FIG. 4a, the direction (angular orientation) that blazed first order 46 emerges from recording 42 with respect to the grating is also substantially a constant, so that little or no dispersion results with quasi-monochromatic light. (To the extent that light beam 40 is not perfectly monochromatic, a certain small amount of dispersion will result.) However, as discussed above, a sufficiently large aperture imaging system can compensate for the dispersion, or even the dispersion resulting from a white readout beam.

As shown in FIG. 4a, imaging lens 48 in the path of blazed first order 46 is effective in imaging the image in the plane of the grating 47 into real image 49 located in the image plane of lens 48. This real image 49 reconstructs the pattern appearing on the positive transparency employed in recording modulated diffraction grating (synthetic focused hologram) master recording 30, in the manner described above. The reason for this is that as described above in connection with FIG. 3, the effective height (or depth) of each point of each line ridge making up the replica of master recording 42 is a direct function of the intensity of light to which the corresponding point of master recording 30 was exposed, which, in turn, is determined by the opacity of the corresponding point of the pattern on the transparency whose focused image was recorded. Since the relative diffracting efficiency is a direct function of this height (or depth) more light will reach those points of real image 49 corresponding to lighter points of the pattern than points corresponding to darker points of the pattern. Therefore, real image 49 will be a positive reconstruction of the original pattern on the transparency whose focused image was recorded on master recording 30.

FIG. 4b shows that a virtual image in the plane of the grating 47 may be directly viewed by eye, in which case imaging lens 48 may be omitted.

Although in the preferred embodiment of the invention, which has just been specifically described, a positive image is obtained by employing a positive transparency together with a positive photoresist, it will be seen that the positive photoresist 16 in FIG. 1 may be replaced by a negative photoresist if, at the same time, a negative transparency is substituted for the positive transparency 23 in FIG. 2a or positive transparency 27 in FIG. 2b employed in recording the modulated diffraction grating (or synthetic focused hologram).

What is claimed is:

1. A method for recording a modulated diffraction grating record of a complex object employing a substrate having a given surface thereof formed of a plurality of spaced line ridges disposed to provide a predetermined diffraction grating on said surface, said substrate being composed of a material which is unaffected by the exposure to an image or development of a given photoresist, said method comprising the steps of filling the spaces between adjacent line ridges with said given photoresist to provide a substantially smooth exterior surface of said given photoresist which is situated in proximity with the respective tops of said line ridges, exposing an area of said exterior surface to illumination which is in the form of a focused image of said object so that each point of said area is exposed to an intensity of illumination which is a function of a corresponding point of said focused image, and developing said given photoresist to form a relief pattern of said focused image wherein the thickness of developed photoresist at any point is a function of the intensity of illumination of the corresponding point of said focused image and the height of the revealed portion of any line ridge at any point of said area depends upon the respective thickness of said photoresist at points of said area contiguous therewith.

2. The method defined in claim 1, further including the step of replicating said relief pattern by employing said modulated diffraction grating record as a master.

3. The method defined in claim 2, wherein the step of replicating includes the steps of making a metal copy of said relief pattern and employing said metal copy to transfer said relief pattern to a heated thermoplastic material by pressing.

4. A modulated diffraction grating master record of any complex object, said record comprising a substrate having a given surface thereof formed of a plurality of spaced line ridges disposed to provide a predetermined diffraction grating on said substrate, and a developed given photoresist disposed on said given surface of said substrate which has had a predetermined exterior surface area thereof exposed to an image of said object, said photoresist being located within the spaces between adjacent line ridges to form a relief pattern of said image wherein the thickness of photoresist at any point of said area is a function of the intensity of illumination of a corresponding point of said image to which that point of said area has been exposed, said substrate being composed of a given material which is unaffected by the exposure to said image or the development of said given photoresist so that the height of the revealed portion of any line ridge at any point of said area depends upon the respective thickness of said photoresist at points of said area contiguous therewith.

References Cited

UNITED STATES PATENTS

| | | | |
|---|---|---|---|
| 3,580,657 | 5/1971 | Sheridon | 350—162 |
| 3,388,735 | 6/1968 | Sayce | 350—162 |
| 2,599,542 | 6/1952 | Carlson | 96—79 |

OTHER REFERENCES

Ramberg: RCA Review, vol. 27, No. 4, pp. 479–481.

NORMAN G. TORCHIN, Primary Examiner

J. WINKELMAN, Assistant Examiner

U.S. Cl. X.R.

96—27 H, 35; 350—162, 3.5